(No Model.)
J. S. CUSSON.
REIN GUARD.
No. 362,430. Patented May 3, 1887.
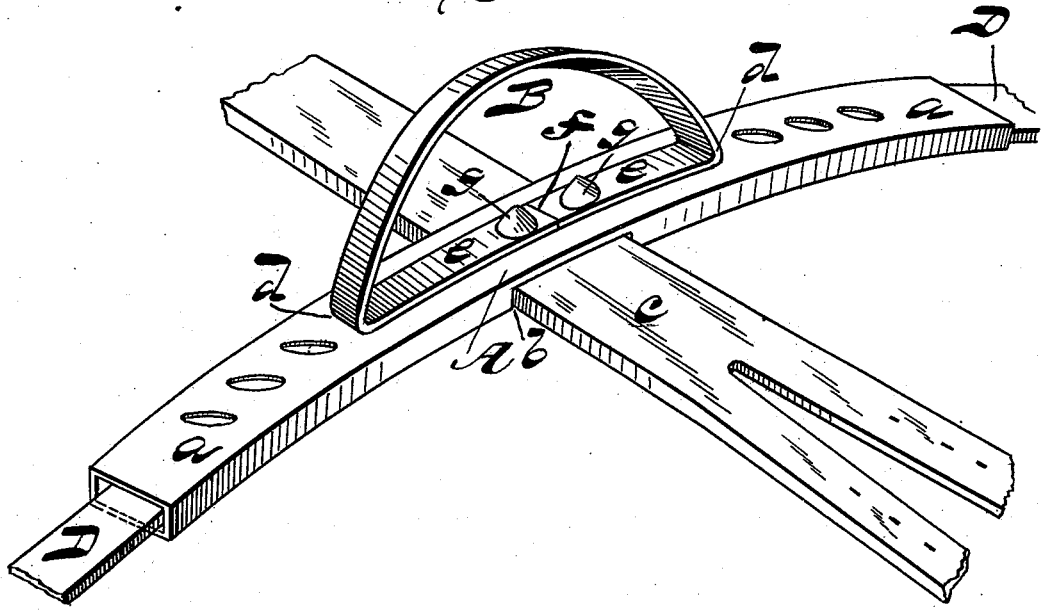
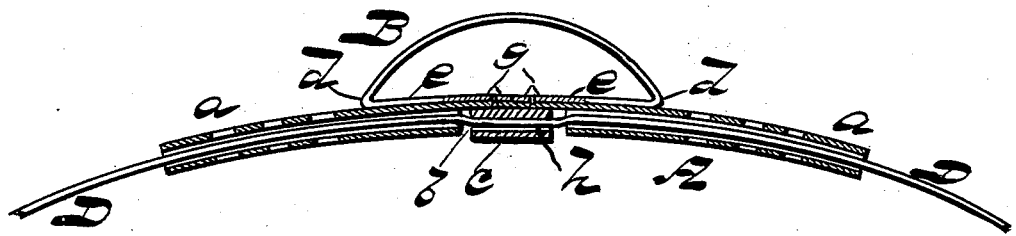
WITNESSES
John Allen
Rutledge Beale
INVENTOR
J. S. Cusson.
by E. H. Bates
Attorney

UNITED STATES PATENT OFFICE.

JAPHET S. CUSSON, OF DE KALB, ILLINOIS.

REIN-GUARD.

SPECIFICATION forming part of Letters Patent No. 362,430, dated May 3, 1887.

Application filed March 1, 1887. Serial No. 229,325. (No model.)

*To all whom it may concern:*

Be it known that I, JAPHET S. CUSSON, a citizen of the United States, residing at De Kalb, in the county of De Kalb and State of Illinois, have invented certain new and useful Improvements in Rein-Guards; and I do hereby declare the following to be a full, clear, and exact description of the invention, such as will enable others skilled in the art to which it appertains to make and use the same.

This invention has relation to improvements in rein-guards for harness; and it consists in the novel construction and arrangement of parts, as will be hereinafter fully described.

The annexed drawings, to which reference is made, illustrate my invention, in which—

Figure 1 represents a perspective view of my device, and Fig. 2 is a vertical cross-sectional view of the same.

Referring by letter to the accompanying drawings, A designates a curved plate forming elongated loops or boxes $a\,a$, which are cut away, as at $b$, to permit the back-strap $c$ to pass between said boxes.

B represents a curved bar, which is bent at $d$ into straight arms $e$, which meet one another, as at $f$, and are perforated to receive rivets $g$, by which said bar is secured to the box-plate.

It will be seen that the reins of a harness pass through this bar or holder, which prevents them from falling under a horse's feet or from being caught in the single-tree of a vehicle. The hip-strap D passes through the boxes, thus securely but removably attaching the one to the other, and the hip-strap aforesaid also passes through a transverse slot, $h$, in the back-strap, thus connecting the former thereto, as well as the rein guard or holder; and it will be further observed that in detaching the device from the harness it is only necessary to withdraw the hip-strap from the box-loops and the parts will readily separate, and in attaching the devices to the harness the hip-strap is passed through first one box, then through the slot in the back-strap, and finally through the other box-loop, and it is simple in operation, not liable to get out of order, durable, can be ornamented to taste, and at the same time cheap to manufacture.

What I claim is—

The rein-guard herein described, consisting of the continuous box A, cut away at $b$ for the passage of the strap $c$, said box adapted to receive the strap D, the curved bar B, bent at $d$ into horizontal arms $e\,e$ and riveted to the box, as shown and described.

In testimony whereof I affix my signature in presence of two witnesses.

JAPHET S. CUSSON.

Witnesses:
 WILLIAM L. POND,
 CHASE E. GLIDDEN.